June 21, 1960  A. A. ROOD  2,941,547
VALVE ASSEMBLY HAVING INFINITELY VARIABLE
LOAD COMPENSATING FLOW CONTROL VALVE
Filed Dec. 23, 1957  4 Sheets-Sheet 1

INVENTOR.
Alvin A. Rood
BY
R. F. Barnard
ATTORNEY

Fig. 6

United States Patent Office 2,941,547
Patented June 21, 1960

2,941,547

VALVE ASSEMBLY HAVING INFINITELY VARIABLE LOAD COMPENSATING FLOW CONTROL VALVE

Alvin A. Rood, Eastlake, Ohio, assignor to General Motors Corporation, Detroit, Mich., a corporation of Delaware Filed Dec. 23, 1957, Ser. No. 704,737

10 Claims. (Cl. 137—621)

The present invention relates to a valve assembly and, in particular, to a valve assembly to be used in a fluid power system to provide smooth, steady application of power irrespective of variations in load on the system.

Valve assemblies of the type specifically referred to herein are of the spool type in that they include a valve body having an inlet pressure port communicating with a source of fluid under pressure, one or more pressure outlet ports communicating with power devices such as fluid operated rams or jacks, and a selectively shiftable valve spool including spaced valve lands for controlling the flow of fluid from the valve inlet port to the desired outlet port. In such valve assemblies, operation of the power devices results from flow of fluid past the valve spool lands, which flow is a function of the pressure drop across the valve lands for any given area of valve land opening. It therefore follows that, for a given valve land opening in conventional valves, a variation in load on the power device or devices will vary the pressure drop across the valve lands thereby changing the flow to the power device or devices. As a matter of fact, as will be recognized by those skilled in this art, increases and decreases in load on the power device will, respectively, decrease and increase the aforementioned pressure drop. As a consequence, and referring to an increase in load by way of example, less flow results across the valve lands resulting in less available pressure for overcoming the load on the power device. As a result of such periodic variations in load on the power device or devices, operation of the latter is relatively rough and sporadic.

In further explanation of the problem aforementioned, reference may be made to power steering systems in general which include a suitable valve, usually of the spool type, for controlling the flow of fluid to a booster steering motor or motors of the ram of jack type. Still further, this invention particularly contemplates a power steering system of the type generally employed with a self-propelled earth-moving scraper.

Conventional types of steering systems do not provide smooth and steady power steering under varying conditions of load on the steering jacks. This is particularly true with power steering systems which are utilized in heavy off-the-road equipment such as self-propelled scrapers. Such a scraper as herein contemplated normally includes a prime mover of the overhung tractor type which is operatively pivotally connected on a vertical hitch and steering axis to a drawn scraper bowl. The power steering system used with such scrapers will normally include an arrangement of one or more steering jacks operatively pivotally connected between the scraper prime mover and bowl. Thus, power steering is accomplished by operation of a control valve to supply fluid under pressure to the steering jack or jacks whereby the tractor and bowl will be articulated about the aforementioned steering axis. However, smooth and steady power steering does not result due to variations in load on the steering jacks as a turn is being accomplished. This situation is caused by the fact that the tractor of the scraper combination meets with varying degrees of rolling resistance which causes variations in load on the jacks which, in turn, will cause the entire scraper assembly to "fish-tail" in steering.

For example, assuming that the load on the steering jacks increases during a turning movement, the jacks tend to stall at least momentarily thereby resulting in a decrease in the pressure drop across the lands of the valve thereby causing less flow fluid to the jacks at the very time in which more flow and more pressure is needed to meet the resistance on the jacks for smooth and steady steering. This problem is magnified by the fact that such variations in load repeatedly occur and in varying degrees, thereby resulting in unsteady and rough steering action.

In view of this serious disadvantage to be found in conventional valve assemblies as employed in fluid power systems in general and steering systems in particular, it is considered desirable to provide a valve assembly including a flow control valve which will provide smooth, steady application of power irrespective of the load on the power devices.

It is, therefore, a general feature and object of this invention to provide a valve assembly for fluid systems in general in which smooth, steady action of the work-applying power device or devices of the system will result irrespective of variation in the load thereon.

It is yet another object and feature of this invention to provide a valve assembly for use in power steering systems for providing smooth and steady steering action irrespective of variation in load on the fluid motors which directly accomplish steering movement.

Still another object and feature of this invention resides in providing a fluid system comprising one or more fluid-operated jacks, a source of fluid under pressure, a valve assembly receiving fluid from the source and including outlet pressure ports for selectively supplying fluid to one or more of the aforementioned jacks, and in which a flow control valve is provided to bypass a varying amount of fluid supplied to said valve from the source in response to a pressure signal from a valve outlet port.

It is yet another object and feature of this invention, and with specific reference to a steering system for self-propelled scrapers, to provide a valve assembly for controlling the supply of fluid from a fluid source to fluid-operated jacks which directly control steering movement of the scraper, and which valve assembly includes an inlet port connected to the fluid source, an outlet port connected to the aforementioned steering jacks, and a flow control valve which will bypass varying amounts of fluid to control inlet port pressures in accordance with a signal provided by the pressure in the outlet port.

It is still a more specific object and feature of this invention to provide a valve assembly of the type aforedescribed in which the bypassed fluid passes through an exhaust port which is controlled by lands on a valve spool whereby, if the flow control valve should fail for any reason, bypass of fluid discharge from the pump may be interrupted by movement of the valve spool to an extreme position.

It is yet a more specific feature and object of this invention to provide a flow control valve for the aforedescribed valve assembly which is simple in construction and operation, and which will be substantially instantaneously responsive to changes in pressure in the aforementioned valve inlet and outlet ports so as to be shifted to vary the pressure available in the steering jacks to compensate for variation in load thereon.

These and other objects, features and advantages of this invention will appear more fully hereinafter as the description of the invention proceeds, and in which reference is made to the following drawings in which.

In the interest of clearly illustrating the structure and function of the valve assembly of this invention, the following description will be directed primarily to such an assembly as incorporated in a power steering system for a self-propelled scraper. Although this valve assembly has particular utility in such a system, it will be readily apparent as the description of the invention proceeds that it also has utility in steering systems in general as well as other fluid systems used in controlling hydraulic motors of various types, and particularly those of the ram or jack type.

Figure 1:
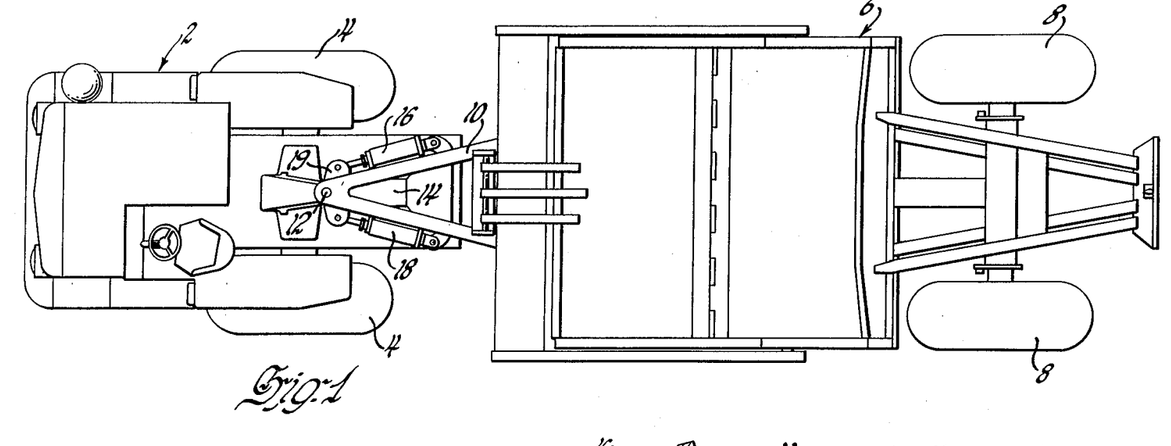
Figure 1 is a plan view showing the general arrangement of a self-propelled scraper with which the subject invention may be used.

Reference will now be made to Figure 1 in which there is shown a self-propelled scraper comprising the prime mover 2 which is shown to be an overhung tractor having a pair of ground-engaging wheels 4 rotatably mounted on an axle which is rigid with the frame of the tractor, and a bowl construction 6 similarly supported on the wheels 8 rotatably mounted on an axle rigid with the frame of the bowl. The bowl includes a pull yoke or gooseneck portion 10 which is pivotally connected to the tractor on a vertical steering or hitch axis 12. A rearwardly extending carriage 14 is fixed to the tractor and has at its rearmost end a laterally extending arm structure to which fluid-operated jack assemblies 16 and 18 are pivotally connected. The forward ends of these jacks are similarly pivotally connected to a laterally extending arm 19 which is rigidly fixed to the pull yoke 10. As will be seen from the drawings, the steering jacks or rams 16 and 18 are operatively pivotally connected to the tractor and bowl on either side of the longitudinal center line of the vehicle through the steering axis 12. In accomplishing power steering of such a vehicle, the tractor and bowl constructions are bodily articulated relative to each other about the steering axis 12 by means of extension of one of the jacks and retraction of the other jack depending upon the direction of steering movement required.

Only general reference has been made to the aforementioned scraper construction inasmuch as it forms no part of the present invention in and of itself. For a more detailed description of the aforementioned scraper, reference may be made to U.S. Patent 2,841,231 granted July 1, 1958, to George E. Armington, entitled "Power Steering Apparatus for Sharp Turning," and assigned to the assignee of the subject invention. As a practical matter, and as will be apparent hereinafter, the subject valve assembly may be used with a scraper steering system as shown in the aforementioned application and as indicated generally in Figure 1, or it may be used with other scraper steering systems utilizing only one steering jack or, in scraper steering systems having more than one jack, with the jacks disposed in other manners relative to the tractor and bowl.

Figure 2:
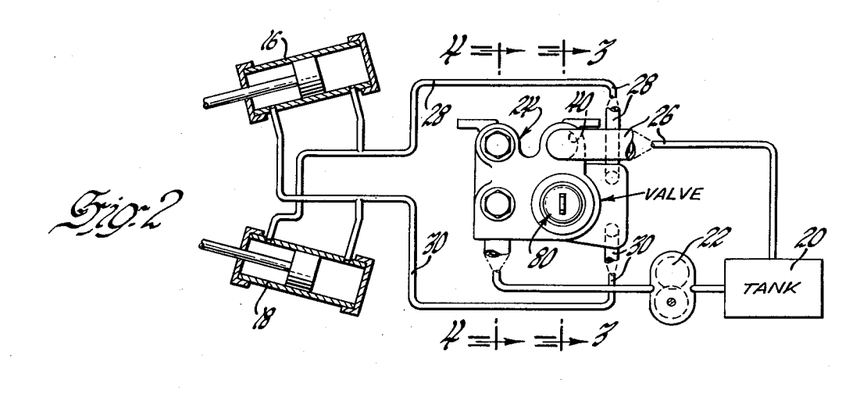
Figure 2 is a view, partly schematic, of a fluid power steering system including the valve assembly of this invention which may be used on the scraper of Figure 1.

Referring now to Figure 2, there is shown a tank or reservoir 20 containing fluid adapted to be supplied by the pump 22 to the valve assembly 24. The valve assembly 24 is connected by return line 26 to the tank. As will be apparent to those skilled in the art, the valve assembly and pump may be located adjacent to and even as a part of a common housing for the tank 20, or all may be in different locations on the vehicle. Moreover, the pump 22 will normally be driven by a suitable power take-off from the engine of the vehicle on which the system is to be employed.

The pressure lines 28 and 30 are respectively connected to two separate fluid outlet ports in the valve assembly 24, and each of these lines is connected in parallel to one end of the one jack 16 and to the opposite end of the other jack 18, as is shown in Figure 2. As will appear more fully hereinafter, operation of the valve assembly will cause fluid to flow in one of the pressure lines 28 or 30 thereby causing one of the jacks to extend and the other to retract for steering purposes, while fluid flows in the opposite direction in the other line to connect exhaust fluid from the jacks with tank 20.

Figure 3:
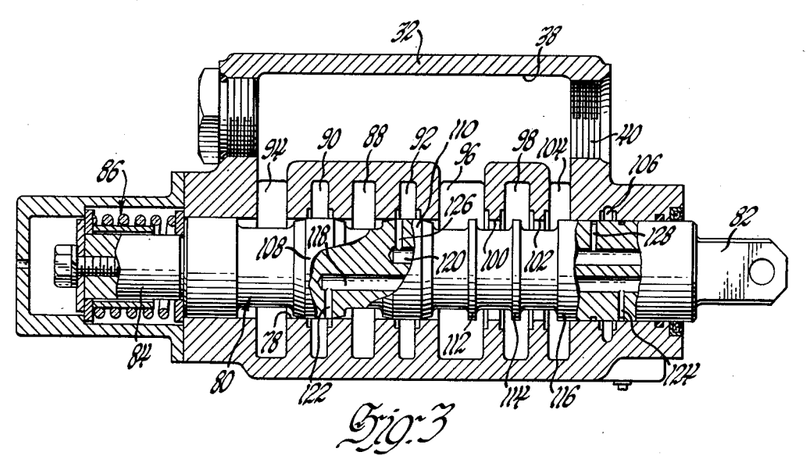
Figure 3 is a cross section view taken on line 3—3 of Figure 2 showing the valve assembly with the valve spool thereof in the neutral position.
Figure 4:
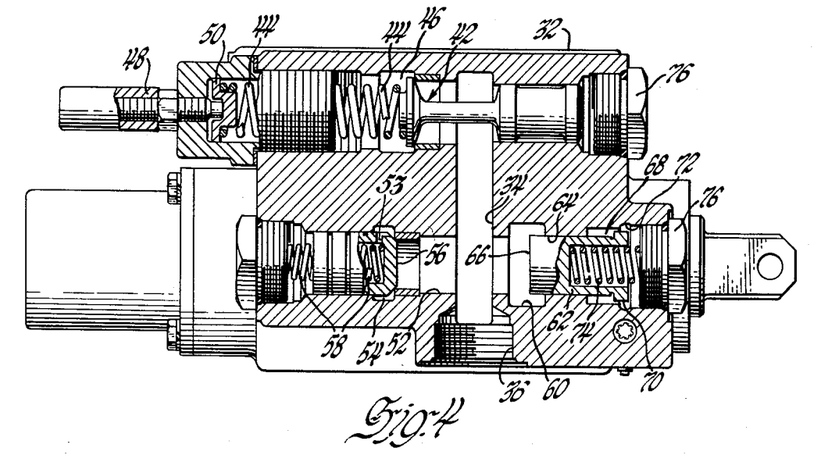
Figure 4 is a cross sectional view taken on line 4—4 of Figure 2 showing the flow control valve in the position corresponding to the valve spool position of Figure 3.

Reference will now be made to Figures 3 and 4 which show the valve assembly with the valve spool thereof in the hold or neutral position in which no steering action is occurring. The valve assembly may be seen to include a valve body or housing 32 having an inlet chamber or gallery 34 (Figure 4) connected to the pump discharge line through the valve body inlet 36, and an exhaust gallery 38 (Figure 3) connected to the return line 26 through the valve body outlet port 40. Referring to Figure 4 particularly, a main relief valve 42 of substantially conventional construction is normally urged by the spring 44 to the right to prevent bypass of fluid from the inlet chamber 34 through internal passages in the valve body including chamber 46 to the exhaust gallery 38. A threaded adjusting screw mechanism 48 is provided to operate against an adjustment washer 50 to control the spring pressure on the relief valve 42 thereby controlling the pressure at which it will open.

The inlet gallery 34 of the valve body communicates through passage 52 with an annular chamber 54 which, as will appear hereinafter, is in communication through internal passages with the inlet port to the main valve portion of the assembly. One-way flow through the passage 52 to the chamber 54 is controlled by the piston type check valve 56 which is urged in a closing direction by the spring 58 as shown in the drawings.

A bypass chamber 60 is adapted to communicate with the inlet gallery 34, the chamber 60 in turn being in communication through internal passages in the valve body with an over-ride chamber in the main valve as will appear hereinafter. A piston type flow control valve 62 is piloted within an aperture 64 in the valve body, and has its forward face 66 continuously subjected to the pressure of fluid, such as oil, entering the valve body through the inlet port 36. The wall of the valve body containing the aperture 64 in which the flow control valve 62 is piloted separates the bypass chamber 60 from a signal chamber 68. The rearmost end of the flow control valve terminates in a radially outwardly extending flange 70 which is reciprocably disposed within the signal chamber 68. As will be noted, an annular groove 72 is formed in the internal side wall of the signal chamber 68 and, moreover, the outer peripheral surface of the flange 70 of the flow control valve is slightly inwardly spaced from the bore of the signal chamber for a purpose to appear more fully hereinafter. A spring 74 engages an internal portion of the flow control valve to normally urge the latter to the left in Figure 4 to throttle the bypass of oil or other fluid from the inlet gallery 34 through the bypass chamber 60 to the over-ride chamber of the main valve.

Suitable threaded plugs 76 provide ready access to the various valve assemblies aforedescribed for maintenance and replacement purposes.

Referring now more specifically to Figure 3, it will be seen that the valve body 32 includes a bore 78 therethrough in which there is disposed a valve spool 80 for reciprocable movement. One end 82 of the valve spool is adapted to be connected to suitable linkage for positioning the spool within the valve body. At its opposite end, the valve spool is provided with a terminal portion 84 of reduced diameter extending into an extension of the valve housing. A valve spool centering mechanism of a well known type is indicated at 86. Suffice it to say that this centering mechanism provides a centering action for the valve spool in order to automatically return the spool to a neutral position when the linkage connected to the end 82 of the spool is de-activated, as will be readily apparent to those acquainted with this art.

An annular inlet port 88 is formed in the valve body and communicates with the aforementioned chamber 54 of Figure 4 which is supplied with fluid from the inlet gallery 34. To either side of the inlet port 88, there are formed annular outlet ports 90 and 92 which are respectively connected to the pressure lines 28 and 30. To either side of the respective outlet ports 90 and 92 there are formed annular exhaust ports 94 and 96 which are in free open communication with the exhaust gallery 38. Near one end of the valve body, an annular over-ride chamber 98 is formed between annular radially inwardly directed axially spaced lands 100 and 102. The over-ride chamber, as aforementioned, is in open communication through internal passages in the valve body to the bypass chamber 60 which communicates with the inlet gallery 34 of the valve body. The over-ride chamber 98 is adapted for communication with exhaust gallery 38 through exhaust port 96 and exhaust port 104. Moreover, near the extreme right end of the valve body there is provided an annular signal pick-up groove 106 which is in open communication with the aforedescribed signal chamber 68 through internal passages in the valve body.

Each of the aforementioned ports and the over-ride chamber are in open communication with the valve body 78 as will be apparent from the drawings. The valve spool 80 is provided with suitable lands to control communication between these various ports, and between the over-ride chamber and the exhaust gallery 38. To this end, a pair of axially spaced tapered spool lands 108 and 110 normally overlie the outlet ports 90 and 92 with the valve spool in a neutral position as shown in Figure 3. In this position, there is neither supply of fluid to nor exhaust of fluid from the jacks 16 and 18, at least to the extent required for operation of the jacks. Thus, with the valve spool in the neutral position, the jacks are held in a selected position at the will of the operator. Moreover, the annular lands 112, 114 and 116 are provided to selectively control flow of oil from the over-ride chamber 98 into the exhaust gallery 38 through the exhaust ports 96 and 104 by engagement with lands 100 and 102 on the valve body. These lands are normally open during normal operation of the valve assembly, but are adapted to be manually closed when necessary to interrupt the flow of oil from the over-ride chamber 98 to tank.

Figure 5:
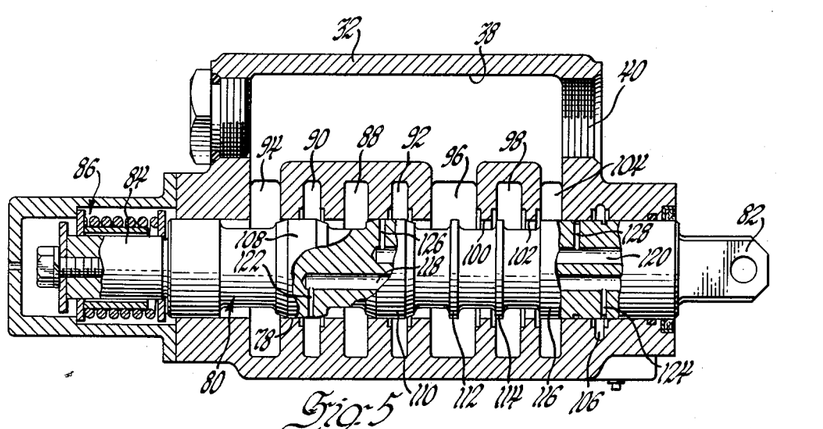
Figures 5 and 6 are views corresponding, respectively, to Figures 3 and 4 but with the valve spool moved from the neutral position for accomplishing operation of a work-applying device such as steering jacks.

It will be seen that the spool has formed therein at least two axially offset longitudinally extending passages 118 and 120. The passage 118 has one or more radial passages 122 and 124 at its opposite ends adapted respectively for communication with outlet port 90 and signal pick-up groove 106 upon shifting the valve spool to the left from the neutral position of Figure 3. Similarly, passage 120 has one or more radial passages 126 and 128 at its opposite ends adapted respectively for communication with outlet port 92 and signal pick-up groove 106 upon shifting the valve spool to the right from the neutral position of Figure 3. For example, and referring to Figure 5 showing the valve spool shifted inwardly (to the left) to accomplish flow of fluid for steering purposes, it will be apparent that upon cracking the valve lands 108, 110 permitting fluid to flow from the inlet port 88 to the outlet port 90 that the radial passages 122 and 124 of passage 118 will become aligned respectively with outlet port 90 and the signal pick-up groove 106 in the valve body. At this time, of course, exhausted fluid from jacks 16 and 18 flows from port 92 through exhaust port 96 to tank.

It will be apparent from the above description that the lands 108 and 110 on the valve spool 80 control the flow of fluid from the inlet port 88 to a selected one of the outlet ports 90 and 92 for the purpose of supplying fluid for steering purposes to the steering jacks 16 and 18. Thus, with the spool disposed in the position shown in Figure 3, the only fluid which will pass from the inlet port 88 to the outlet ports 90 and 92 will be in the nature of a leakage based on design considerations, and will in no way effect steering of the vehicle until such time as the valve spool is shifted as, for example, to the position shown in Figure 5. Moreover, it will be apparent that the rate of operation of the jacks will depend primarily upon the area of the opening between the respective tapered valve lands 108 and 110 and the lands on the valve body separating the various ports therein. It will also be seen that variable amounts of oil or other fluid supplied to the inlet 36 in the valve body will be bypassed through the chamber 60, over-ride chamber 98 and exhaust gallery 38 in accordance with the position of the flow control valve 62. To this end, the flow control valve is urged to a by-pass circuit opening position due to the pressure of the fluid supplied by the pump acting on its front face 66, while it is urged to a bypass circuit closing position by means of the pressure of the fluid in one or the other of the outlet ports 90 and 92 as signalled through one of the internal passages in the valve spool and pick-up groove 106 in the valve body to the signal chamber 68 behind the flow control valve. The spring 74, of course, aids the signal pressure in urging the flow control valve to a bypass throttling position.

At this juncture, it may be noted that several considerations enter into the selection of a specific spring 74 for use with the flow control valve 62. In the first place, with the valve spool 80 in the neutral position shown in Figure 3, it is desirable to maintain fluid in the lines 28 and 30 connected to outlet ports 90 and 92 so that shifting of the valve spool results immediately in steering action rather than a preliminary line expansion which would delay steering. Still further, it is desirable to have a moderate pump pressure, for example approximately 100 p.s.i., with the valve spool in the neutral position in order to conserve horsepower developed by the engine driving the pump. In view of these among other considerations, and referring to the specific embodiment of the valve shown and its use in scraper power steering, the overlaps of the tapered spool lands 108 and 110 at the jack outlet ports 90 and 92 may be made substantially equal at the inlet and exhaust sides of the latter with the spool in the neutral position. As a result of this overlap design including its tapered construction, fluid delivered at pump pressure to the inlet port 88 will leak across the spool lands 108 and 110 into the jack outlet ports 90 and 92 to initially fill the steering lines 28 and 30 and, after the lines are filled, will leak into exhaust ports 94 and 96 which are at tank pressure. Upon the steering lines being initially filled and with the spool in the neutral position, it may be seen that fluid circulates from the inlet port 88 across jack outlet ports 90 and 92 and through the exhaust ports 94 and 96. As a result of valve land design as mentioned above, both of the outlet ports 90 and 92 will be at a pressure approximately equal to one-half of pump pressure on the average with respect to time. Naturally, this specific relationship could be varied within reason by changing the design of the spool lands and their overlaps as aforedescribed. However, once a particular relation has been selected, it will be apparent that a spring 74 will be selected having an equivalent hydraulic force which, when added to the fluid pressure in the signal chamber 68, will provide a force substantially equal to pump pressure in the valve body inlet chamber 34 to balance the flow control valve.

For example, with the valve spool in the neutral position shown in Figure 3, it has been found to be desirable to deliver fluid to the chamber 34 at approximately 100 p.s.i. As a result, the pressure in the outlet ports 90 and 92 is substantially 50 p.s.i. due to spool land design aforementioned. Therefore, in order to balance the pressure of 100 p.s.i. in the valve body inlet chamber 34, a spring 74 having a hydraulic equivalent of 50 p.s.i. must be added to the 50 p.s.i. pressure signalled to the signal chamber 68 from the outlet ports 90 and 92. The 50 p.s.i. pressure signal, with the spool in the neutral position of Figure 3, results from leakage of fluid from radial passages 128 and 124 into pick-up groove 106 disposed therebetween. The pressure of this fluid in groove 106 will substantially equal the average of the pressures in the radial passages, which average is 50 p.s.i. Finally, it should be noted that once the spring 74 is selected having a force equal to a hydraulic pressure of 50 p.s.i., the flow control valve will maintain a substantially constant pressure drop across inlet port 88 and ports 90 and 92 equal to this spring pressure irrespective of variation in the area of the valve land openings controlling the power supply of fluid from the inlet port 88 to a selected one of the outlet ports 90 or 92. This function of the flow control valve will appear more fully hereinafter.

Prior to considering the operation of the valve assembly of this invention, mention will be made of the manner in which a conventional valve would function in the absence of a flow control valve as herein disclosed in order to clearly show the manner in which the present valve differs therefrom. With the valve spool of a conventional valve disposed in the "in" position as shown in Figure 5, oil would flow from the inlet port 88 to the outlet port 90 and to the pressure line 28. This fluid would then branch to opposite ends of the jacks 16 and 18 thereby causing extension of the former and retraction of the latter to accomplish steering about the vertical steering axis 12. Exhausted fluid from the jacks would pass through line 30, jack port 92, exhaust port 96, exhaust gallery 38 and return line 26 to tank. Ignoring friction losses and spring 58 acting on valve 56, the pressure of the fluid in the inlet port 88 will be substantially equal to the pressure of the fluid supplied through the valve body inlet to the inlet gallery 34. Assume now a reference condition of load on the steering jacks in which the pressure in the outlet port 90 will be some fixed value less than the pressure in the inlet port 88 thereby giving a pressure drop across the opening defined between the valve body and the spool land; for example, assume there to be pressures of 750 and 700 p.s.i. respectively at the inlet port 88 and outlet port 90. Moreover, let it be assumed that the spool has been moved to a fixed position as is shown in Figure 5 whereby the valve land opening is of a fixed area.

Under the above described circumstances, the flow between the inlet and outlet ports will be determined according to the following basic equation: $F = A\sqrt{dp}$ (ignoring constants and pressure losses), in which F indicates flow, A indicates the area of the valve land opening and $dp$ indicates pressure drop between the inlet and outlet ports 88 and 90. Assume now that in the conventional valve an increased resistance to steering is encountered which results in an increased load on the steering jacks. As a result, the pressure in the outlet port 90 will rise thereby resulting in a smaller pressure drop across the valve land opening of fixed area and, therefore, a smaller flow therethrough. As a result, there is not enough available pressure to carry the jacks on through for smooth steady steering action. Conversely, if the load on the steering jacks should decrease, the pressure in port 90 will decrease resulting in increased flow to the jacks and faster steering articulation. Realizing that such load variation will occur repeatedly and for varying duration, it will be seen that relatively rough, jerky and unsure steering action will result.

Figure 6:
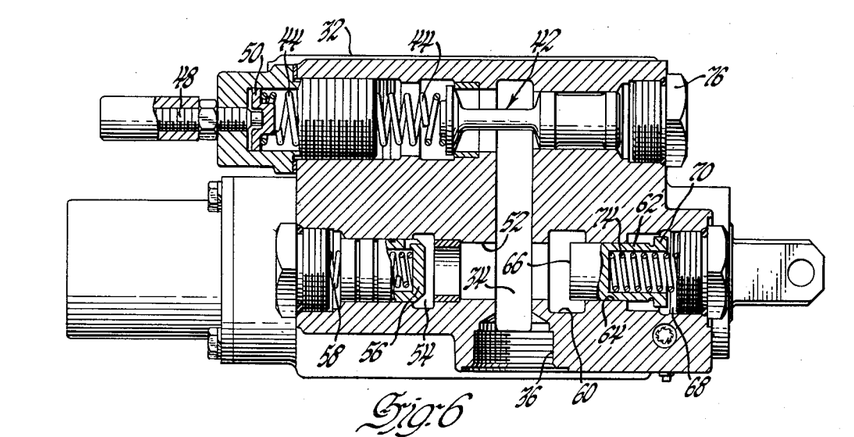

With respect to the valve assembly of this invention, and assuming the same circumstances above with the valve in the Figure 5 position, an increase in pressure in the cylinder outlet port 90 will be signalled to the signal chamber 68 to shift the flow control valve 62 to the left in Figure 6 thereby throttling the bypass chamber 60. As a result, more fluid is supplied to the inlet port 88 to raise the pressure to such an extent as to again have the design pressure drop of 50 p.s.i. across the valve land opening. Conversely, if the pressure in the outlet port 90 should drop due to a decrease in load on the steering jacks such as might be encountered as the vehicle is steered in going down a hill, this decrease in pressure is signalled to the flow control valve which will then shift to the right in Figure 6 to allow more fluid to be bypassed through the over-ride chamber 98 to tank. Consequently, there is a drop of pressure in the inlet port 88 to such an extent as to again establish the designed pressure drop of 50 p.s.i. Thus, for any given fixed area of valve land opening, the flow control valve will move to infinitely vary the amount of fluid which is bypassed through the over-ride chamber and, consequently, vary the pressure available at the inlet port. As a result, as the load varies on the jacks 16 and 18, the flow control valve will function to maintain a constant pressure drop across the valve lands and, according to the basic equation, thereby maintain a constant flow to provide the required pressure needed in the cylinder jacks for smooth and steady power steering.

It should be noted that the function of bypassing more or less of pump output to tank by the flow control valve will depend upon the requirements of the jacks only. The action of the flow control valve is governed in the final analysis by pressure variations at the steering jacks thereby maintaining a constant pressure drop across the valve lands of the spool. Therefore, steering flow from the inlet port to a selected one of the outlet ports is strictly a function of valve land opening. Consequently, it should be apparent that for any given area of valve land opening selected for a desired rate of steer the flow control valve will still function to modulate pressure as aforedescribed.

As aforedescribed, in conjunction with Figure 3, the annular flange 70 of the flow control valve is slightly inwardly spaced from the bore of the signal chamber 68, and this bore is provided with a groove 72. This construction permits some of the fluid from the signal circuit to pass to the left of the flange 70 to provide a dampening action to prevent chattering of the flow control valve, and to provide silent operation and fine control of the valve.

With respect to the piston type check valve 56 which is disposed in the passage 52 through which pump discharge is supplied to the inlet port 88, this valve is not absolutely necessary to the operation of this system; that is, the inlet gallery 34 can be considered as being directly connected to the inlet port 88. The primary purpose of the valve 56 is to prevent any inordinately large back pressures from the cylinder jacks 16 and 18 from acting against pump pressure. To this end, a small port 53 (Figure 4) is provided in the side wall of the valve 56 thereby permitting any such back pressure to act on the interior of the valve in concert with the spring 58 to close the valve, thereby protecting the pump from such a back pressure.

As previously mentioned, all of the oil which is bypassed to tank through the chamber 60 must pass through the over-ride chamber 98 and into the exhaust gallery 38. With the valve shown in the neutral position of Figure 3 or in the "in" position of Figure 5, the over-ride chamber is in free communication with the exhaust gallery. However, provision has been made for a situation in which for one reason or another the flow control valve 62 should become stuck in a full open position. If such a situation were to occur, it will be obvious that most if not all of the fluid discharge from the pump would pass from the inlet gallery 34 through the bypass chamber 60, over-ride chamber 98 and from there to the tank. As a result, no fluid or not enough fluid would be available for steering purposes.

Figure 7:
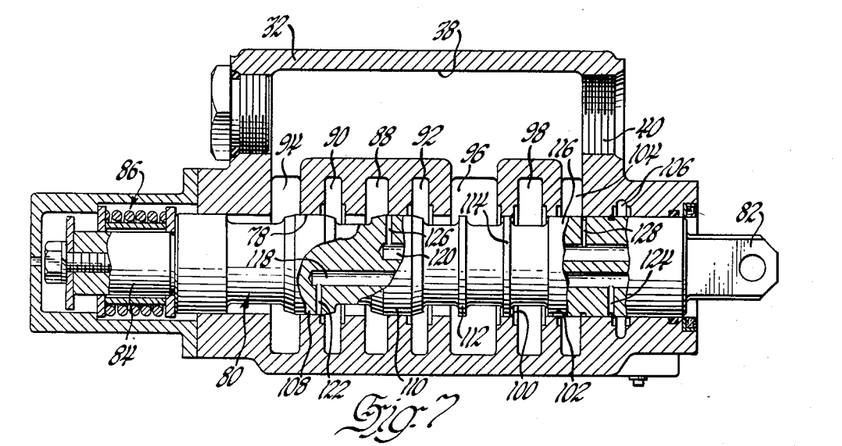
Figures 7 and 8 are views corresponding, respectively, to Figures 3 and 4 but with the valve spool shifted to an extreme position from neutral.
Figure 8:
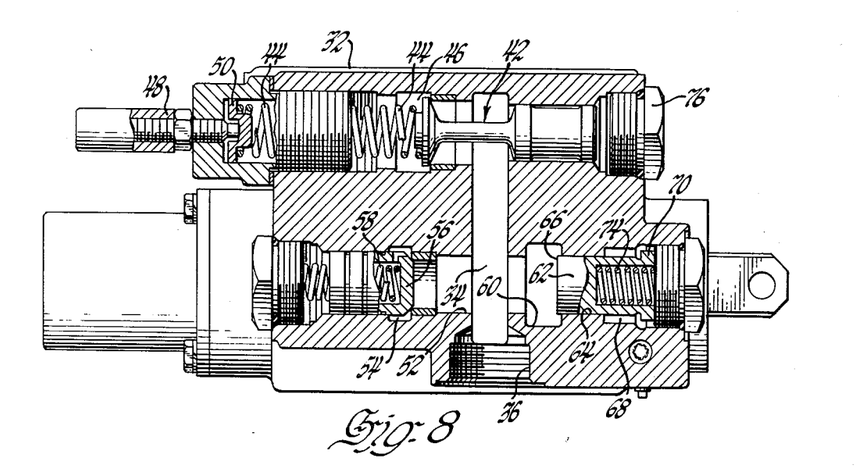

In provision for exigencies of this type, the valve lands 112, 114 and 116 are provided on the valve spool so that, upon moving the spool as far as it will go in either direction during steering, various pairs of these lands will disconnect the over-ride chamber 98 from communication with the exhaust gallery. Thus, assume that steering was being accomplished with the valve positioned as shown in Figure 5, and assume that there is a failure in the flow control valve causing it to become stuck to the extreme right hand-position as shown in Figure 8. The vehicle operator, upon sensing a loss of steering pump pressure, would then merely shift the valve spool to the full left position as shown in Figure 7 thereby causing the lands 114 and 116 to mate with the lands 100 and 102 on the valve body thereby preventing further passage of bypassed fluid to the exhaust gallery 38. As a result, the fluid has no choice but to pass to the inlet port 88 thereby being made available for steering purposes. It will also be apparent that in steering in the opposite direction, the spool valve lands 112 and 114 are used to mate with the body lands 100 and 102 to cut off fluid bypass.

It will now be seen, with reference to the above description, that the subject valve assembly is an extremely compact structure which will provide substantially instantaneous compensation for variations in load on power devices such as hydraulic rams or jacks, particularly as employed in a scraper power steering system. As a consequence, smooth and steady application of steering power by these jacks results. However, although this particular valve has been described in conjunction with a steering system for self-propelled scrapers, the applicability and usefulness of it with respect to other systems, and not necessarily steering systems, will now be quite apparent. In general, therefore, the valve assembly of this invention and particularly the flow control function thereof could be adapted to any fluid system in which it is desirable to maintain a smooth and steady application of power by hydraulic motors irrespective of the load thereon. It will, therefore, be understood that the above description with respect specifically to a power steering system for use with self-propelled scrapers has been merely for illustrative purposes, and is in no way intended to limit the scope of this invention which is defined by the claims which follow.

I claim:

1. A valve assembly comprising a valve body having a bore therethrough, inlet and exhaust chambers in said valve body, a pair of axially spaced outlet ports, an inlet port between said outlet ports and connected to said inlet chamber, said ports communicating with said bore, a valve spool reciprocably disposed within said bore for movement in either direction from a neutral position and including axially spaced valve lands preventing power flow of fluid from said inlet port to said outlet ports with said spool in a neutral position, said spool being movable in either direction from said neutral position to provide power flow of fluid from said inlet port to a selected one of said outlet ports, a bypass chamber in said body communicating with said inlet chamber and exhaust chamber, a signal chamber in said valve body, a partition in said valve body separating said signal chamber from said bypass chamber, a flow control valve movably disposed within said partition and being acted upon in opposite directions respectively by the pressure of fluid in said inlet chamber and signal chamber to bypass variable amounts of fluid from said inlet chamber through said bypass chamber to said exhaust chamber, and signal circuit means for establishing communication between said selected one of said outlet ports and said signal chamber whereby the pressure in the latter varies with the pressure at said selected one outlet port, said signal circuit means comprising a signal pick-up groove in said valve body surrounding said spool and communicating with said signal chamber, a pair of axial passages through said valve spool, spaced radial passages communicating with each of said axial passages, said radial passages of each axial passage being axially offset, whereby said selected one of said outlet ports is placed in communication with said signal pick-up groove upon shifting of said spool in either direction from its neutral position.

2. A valve assembly comprising a valve body, inlet and exhaust chambers in said valve body, an outlet port, an inlet port connected to said inlet chamber, an over-ride chamber connected to said exhaust chamber, a valve member movably disposed within said valve body and including means normally overlying said outlet port with said member in a neutral position to prevent power flow of fluid from said inlet port to said outlet port, said member being movable from its neutral position to provide power flow of fluid from said inlet port to said outlet port, additional means on said valve member normally maintaining open communication between said over-ride chamber and said exhaust chamber with said member in a neutral or shifted position while acting to interrupt said communication upon shifting said member to an extreme position, a bypass chamber in said body communicating with said inlet chamber and over-ride chamber, a signal chamber in said valve body, a partition in said valve body separating said signal chamber from said bypass chamber, a flow control valve movably disposed within said partition and being acted upon in opposite directions respectively by the pressure of fluid in said inlet chamber and signal chamber to bypass variable amounts of fluid from said inlet chamber through said bypass chamber to said over-ride chamber, and signal circuit means for establishing communication between said outlet port and said signal chamber whereby the pressure in the latter varies with the pressure at said outlet port, said signal circuit means comprising passage means in said valve member establishing communication between said outlet port and said signal chamber upon movement of said member from its neutral position.

3. A valve assembly comprising a valve body having a bore therethrough, inlet and exhaust chambers in said valve body, a pair of axially spaced pressure outlet ports, a pressure inlet port between said outlet ports and connected to said inlet chamber, an over-ride chamber connected to said exhaust chamber, said ports and over-ride chamber communicating with said bore, a valve spool reciprocably disposed within said bore for movement in either direction from a neutral position and including axially spaced valve lands normally overlying said outlet ports with said spool in its neutral position to prevent power flow of fluid from said inlet port to said outlet ports, said spool being movable in either direction from said neutral position to provide power flow of fluid from said inlet port to a selected one of said outlet ports, additional valve land means on said spool normally maintaining open communication between said over-ride chamber and said exhaust chamber with said spool in a neutral or shifted position while acting to interrupt said communication upon shifting said spool to an extreme position, a bypass chamber in said body communicating with said inlet chamber and over-ride chamber, a signal chamber in said valve body, a partition in said valve body separating said signal chamber from said bypass chamber, a piston-type flow control valve movably disposed within said partition and being acted upon in opposite directions respectively by the pressure of fluid in said inlet chamber and signal chamber to bypass variable amounts of fluid from said inlet chamber through said bypass chamber to said over-ride chamber, and signal circuit means for establishing communication between said selected one of said outlet ports and said signal chamber whereby the pressure in the latter varies with the pressure at said selected one outlet port, said signal circuit means comprising a signal pick-up groove in said valve body surrounding said spool and communicating with said signal chamber, a pair of axial passages through said valve spool, spaced radial passages communicating with each of said axial passages, said radial passages of each axial passage being axially offset, whereby said selected one of said outlet ports is placed in communication with said signal pick-up groove upon shifting of said spool in either direction from its neutral position.

4. A fluid system comprising a fluid-operated power device, a source of fluid under pressure, circuit means establishing fluid communication between said source and device, valve means in said circuit including a valve body, a fluid inlet port in said body communicating with said source, a fluid outlet port in said body communicating with said device, a movable valve member controlling communication between said inlet and outlet ports, fluid bypass circuit means establishing communication between said inlet port and said source, a flow control valve in said bypass circuit means and being urged in a bypass circuit opening direction in response to inlet port pressure, and signal circuit means communicating said outlet port with said flow control valve to urge the latter in a bypass circuit closing direction, said valve member being movable to a position interrupting fluid flow in said bypass circuit means independently of the position of said flow control valve.

5. A fluid system comprising a fluid-operated power device, a source of fluid under pressure, circuit means establishing fluid communication between said source and device, valve means in said circuit including a valve body, a fluid inlet port in said body communicating with said source, a fluid outlet port in said body communicating with said device, a movable valve member controlling communication between said inlet and outlet ports, fluid bypass circuit means establishing communication between said inlet port and said source, a flow control valve in said bypass circuit means and being urged in a bypass circuit opening direction in response to inlet port pressure, and signal circuit means communicating said outlet port with said flow control valve to urge the latter in a bypass circuit closing direction, said signal circuit means establishing communication between said outlet port and flow control valve upon movement of said valve member, said valve member being movable to a position interrupting fluid flow in said bypass circuit means independently of the position of said flow control valve.

6. A fluid system comprising a fluid-operated power device, a source of fluid under pressure, circuit means establishing fluid communication between said source and device, valve means in said circuit including a valve body, a fluid inlet port in said body communicating with said source, a fluid outlet port in said body communicating with said device, a movable valve member controlling communication between said inlet and outlet ports, fluid bypass circuit means establishing communication between said inlet port and said source, a flow control valve in said bypass circuit means and being urged in a bypass circuit opening direction in response to inlet port pressure, and signal circuit means communicating said outlet port with said flow control valve to urge the latter in a bypass circuit closing direction, said signal circuit means including a passage in said valve member establishing communication between said outlet port and flow control valve upon movement of said valve member, said flow control valve being operable to bypass variable amounts of fluid to maintain a substantially constant pressure drop across said inlet port and outlet port.

7. A fluid system comprising a pair of fluid-operated power devices, a source of fluid under pressure, circuit means establishing fluid communication between said source and devices, valve means in said circuit including a valve body, a fluid inlet port in said body communicating with said source, fluid outlet ports in said body communicating with said devices, a movable valve member controlling communication between said inlet and outlet ports, fluid bypass circuit means establishing communication between said inlet port and said source, a flow control valve in said bypass circuit means and being urged in a bypass circuit opening direction in response to inlet port pressure, and signal circuit means selectively communicating a selected one of said outlet ports with said flow control valve to urge the latter in a bypass circuit closing direction, said signal circuit means including passages in said valve member respectively reselectively communicable with said selected outlet port and flow control valve upon movement of said valve member, said flow control valve being operable to bypass variable amounts of fluid to maintain a substantially constant pressure drop across said inlet port and said selected outlet port.

8. A fluid system comprising a fluid-operated power device, a source of fluid under pressure, circuit means establishing fluid communication between said source and device, valve means in said circuit including a valve body, a fluid inlet port in said body communicating with said source, an outlet port in said body communicating with said power device, a movable valve member disposed within said body controlling communication between said inlet port and power device through said outlet port, bypass circuit means establishing communication between said inlet port and said source, a flow control valve in said bypass circuit means and being continuously subjected to the pressure of the fluid in said inlet port to urge said valve in a bypass circuit opening direction, and signal circuit means selectively communicating said outlet port with said flow control valve to urge the latter in a circuit closing direction, said signal circuit means including a passage through said valve member communicable with said outlet port only upon movement of said valve member from a neutral position in which there is no fluid flow to said power device through said outlet port to a position in which said flow occurs, said flow control valve being operable to bypass variable amounts of fluid to maintain a substantially constant pressure drop across said inlet port and said outlet port upon movement of said valve member from said neutral position.

9. A fluid system comprising a pair of fluid-operated power devices, a source of fluid under pressure, circuit means establishing fluid communication between said source and devices, a valve assembly in said circuit means; said assembly comprising a valve body, said valve body having an inlet chamber connected to said source, an exhaust gallery in said body, a bore within said body, said body having two pairs of associated inlet and exhaust ports axially spaced along and communicating with said bore, each of said outlet ports communicating with said devices and each of said exhaust ports communicating with said exhaust gallery, an inlet port in said body between said pairs of outlet and exhaust ports and communicating with said inlet chamber and said bore, a valve spool movably disposed within said bore and comprising a pair of axially spaced valve lands normally overlying said outlet ports in a neutral spool position to prevent power-applying fluid flow through said valve assembly, a fluid bypass circuit communicating said valve inlet chamber with said exhaust gallery, a pressure signal chamber in said valve body, a flow control valve movably disposed within said bypass circuit and subjected in one direction to the pressure of fluid in said inlet chamber and in the opposite direction to the pressure in said signal chamber to control fluid flow through said bypass circuit, signal circuit means for establishing communication between said signal chamber and a selected one of said outlet ports communicating with said inlet port upon shifting of said valve spool, said signal circuit means comprising a signal pick-up groove in said valve body surrounding said valve spool and communicating with said signal chamber, and a pair of axial passages through said valve spool selectively respectively communicating said pick-up groove with said selected outlet port upon shifting said spool in opposite directions from a neutral position, said flow control valve being operable to bypass variable amounts of fluid to maintain a substantially constant pressure drop across said inlet port and said selected outlet port upon shifting said spool from said neutral position.

10. A fluid system comprising a pair of fluid-operated jacks, a source of fluid under pressure, circuit means establishing fluid communication between said source and said jacks, a valve assembly in said circuit means; said valve assembly comprising a valve body having an inlet chamber connected to said source and an exhaust gallery, a bore through said valve body, a pair of axially spaced sets of ports within said body communicating with said bore, each of said sets of ports including an outlet port communicating with said jacks and an exhaust port communicating with said exhaust gallery, an inlet port in said body between said sets of ports and communicating with said bore and with said inlet chamber, an over-ride chamber within said valve body and communicating with said exhaust gallery through said valve body bore, a valve spool shiftably mounted within said bore and having first valve land means thereon controlling communication between said inlet port and the outlet port of each set of ports and communication between the outlet port and exhaust port of each set of ports, second valve land means controlling communication between said over-ride chamber and said exhaust gallery, said first valve land means being so disposed on said spool relative to said ports whereby no substantial fluid flow occurs between said ports with the valve spool in neutral position, said valve spool being shiftable to establish fluid communication between said inlet port and the outlet port of a selected one set of ports and communication between the outlet port and exhaust port of the other set of ports, said second valve land means normally maintaining open communication between said over-ride chamber and said exhaust gallery with the valve spool in said neutral or shifted positions, a bypass chamber within said valve body establishing fluid communication from said inlet chamber said over-ride chamber, a flow control valve having one end thereof subject to pressure in said inlet chamber to control flow of fluid from said inlet chamber through said bypass chamber to said over-ride chamber, the other end of said valve being disposed in a signal chamber distinct from said bypass chamber, signal circuit means establishing fluid communication between said signal chamber and said selected one outlet port with said valve spool in said shifted position to urge said flow control valve in a closing direction relative to said bypass chamber in opposition to the pressure of fluid in said inlet chamber, said single circuit means comprising a signal pick-up groove in said valve body in communication with said bore and said signal chamber, and passage means internally of said valve spool for establishing communication between said selected one outlet port and said signal pick-up groove with said spool in said shifted position, said valve spool being shiftable to an extreme position whereby said second valve land means interrupts communication between said over-ride chamber and said exhaust gallery.

References Cited in the file of this patent

UNITED STATES PATENTS

| | | |
|---|---|---|
| 1,775,856 | Hauser | Sept. 16, 1930 |
| 2,057,087 | De Millar | Oct. 13, 1936 |
| 2,319,551 | Linden et al. | May 18, 1943 |
| 2,614,644 | Gustafson | Oct. 21, 1952 |
| 2,624,533 | Brader | Jan. 6, 1953 |
| 2,751,932 | Stueland | June 26, 1956 |